United States Patent
Morimatsu

(10) Patent No.: US 7,009,737 B2
(45) Date of Patent: Mar. 7, 2006

(54) IMAGE PROCESSING METHOD AND APPARATUS

(75) Inventor: Hiroyuki Morimatsu, Kurume (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 930 days.

(21) Appl. No.: 09/866,929

(22) Filed: May 30, 2001

(65) Prior Publication Data

US 2002/0051233 A1    May 2, 2002

(30) Foreign Application Priority Data

Jun. 2, 2000    (JP)    ............... 2000-165502

(51) Int. Cl.
*H04N 1/40*    (2006.01)
(52) U.S. Cl. .................. 358/3.14; 358/3.13
(58) Field of Classification Search ............ 358/1.9, 358/2.1, 3.06–3.1, 3.13–3.2, 518, 521; 382/237
See application file for complete search history.

(56) References Cited

U.S. PATENT DOCUMENTS 5,394,252 A * 2/1995 Holladay et al. ........... 358/533

FOREIGN PATENT DOCUMENTS

EP    817468 A1 *    4/2002

* cited by examiner

*Primary Examiner*—Thomas D. Lee
*Assistant Examiner*—Stephen Brinich

(57) ABSTRACT

A non-periodic dot output arrangement is taken in the low thickness region, and a periodic dot output arrangement is taken in the intermediate and high thickness region. In addition, error diffusion processing is made for all thickness regions. Small dots are produced in the non-periodic dot arrangement low-thickness region, and dot-concentrated-type dots are produced in the periodic dot arrangement intermediate-and-high-thickness region. Moreover, non-periodic dots are produced in the edge region of the image.

27 Claims, 8 Drawing Sheets

FIG. 2A

| 1 | 3 | 5 | 3 | 1 |
|---|---|---|---|---|
| 3 | 6 | 0 | 6 | 3 |
| 5 | 0 | ※ |   |   |

| 1 | 2 | 3 | 2 | 1 |
|---|---|---|---|---|
| 2 | 4 | 6 | 4 | 2 |
| 3 | 6 | ※ |   |   |

| 237 | 166 | 223 | 118 | 61 | 104 | 239 | 169 | 225 | 119 | 63 | 105 | 238 | 167 | 224 |
|-----|-----|-----|-----|-----|-----|-----|-----|-----|-----|-----|-----|-----|-----|-----|
| 180 | 251 | 152 | 25 | 5 | 56 | 183 | 253 | 155 | 28 | 6 | 54 | 181 | 252 | 153 |
| 194 | 138 | 209 | 82 | 32 | 98 | 197 | 140 | 211 | 84 | 30 | 97 | 196 | 139 | 210 |
| 124 | 67 | 110 | 229 | 159 | 215 | 126 | 70 | 112 | 228 | 157 | 214 | 125 | 69 | 111 |
| 21 | 11 | 46 | 173 | 243 | 145 | 18 | 13 | 44 | 171 | 242 | 143 | 16 | 12 | 50 |
| 77 | 43 | 88 | 187 | 130 | 201 | 74 | 34 | 87 | 185 | 129 | 199 | 72 | 38 | 92 |
| 240 | 170 | 226 | 116 | 60 | 102 | 231 | 161 | 217 | 115 | 58 | 101 | 235 | 165 | 221 |
| 184 | 254 | 156 | 29 | 3 | 48 | 175 | 245 | 147 | 20 | 2 | 52 | 179 | 250 | 151 |
| 198 | 141 | 212 | 85 | 39 | 90 | 189 | 133 | 203 | 76 | 41 | 94 | 193 | 137 | 207 |
| 127 | 71 | 113 | 236 | 166 | 222 | 118 | 62 | 104 | 239 | 168 | 225 | 123 | 66 | 108 |
| 26 | 14 | 53 | 180 | 250 | 152 | 25 | 6 | 55 | 182 | 253 | 154 | 27 | 10 | 46 |
| 82 | 33 | 95 | 194 | 138 | 208 | 81 | 31 | 98 | 196 | 140 | 210 | 83 | 35 | 88 |

FIG. 4

| 64 | 0 | 16 | 143 | 184 | 119 | 103 | 168 | 72 | 56 | 24 | 167 | 132 | 123 | 107 |
|---|---|---|---|---|---|---|---|---|---|---|---|---|---|---|
| 80 | 32 | 48 | 159 | 248 | 216 | 200 | 232 | 88 | 40 | 8 | 151 | 244 | 212 | 196 |
| 175 | 96 | 112 | 191 | 68 | 4 | 20 | 155 | 135 | 104 | 120 | 183 | 69 | 5 | 21 |
| 223 | 207 | 239 | 255 | 116 | 36 | 52 | 139 | 215 | 199 | 231 | 247 | 85 | 37 | 53 |
| 161 | 30 | 14 | 78 | 171 | 84 | 100 | 187 | 65 | 49 | 17 | 158 | 170 | 117 | 138 |
| 129 | 62 | 46 | 94 | 219 | 203 | 235 | 251 | 142 | 33 | 1 | 81 | 218 | 202 | 234 |
| 177 | 126 | 110 | 145 | 165 | 26 | 10 | 74 | 190 | 97 | 113 | 174 | 160 | 31 | 15 |
| 241 | 209 | 193 | 225 | 90 | 58 | 42 | 149 | 222 | 206 | 238 | 254 | 95 | 63 | 47 |
| 67 | 3 | 19 | 172 | 133 | 122 | 106 | 181 | 73 | 41 | 25 | 166 | 128 | 127 | 111 |
| 83 | 35 | 51 | 140 | 245 | 213 | 197 | 229 | 89 | 9 | 57 | 134 | 240 | 208 | 192 |
| 156 | 99 | 115 | 188 | 70 | 6 | 22 | 169 | 150 | 105 | 121 | 182 | 75 | 11 | 27 |
| 220 | 204 | 236 | 252 | 153 | 38 | 54 | 86 | 214 | 198 | 230 | 246 | 148 | 43 | 59 |

FIG. 8
PRIOR ART

HORIZONTAL DIRECTION →

VERTICAL DIRECTION ↓

| 0 | 86 | 172 | 21 | 107 | 193 | 4 | 89 | 175 | 25 | 111 | 197 |
|---|---|---|---|---|---|---|---|---|---|---|---|
| 29 | 114 | 200 | 50 | 136 | 222 | 32 | 118 | 204 | 54 | 140 | 225 |
| 57 | 143 | 229 | 79 | 165 | 250 | 61 | 147 | 233 | 82 | 168 | 254 |
| 14 | 100 | 186 | 7 | 93 | 179 | 18 | 104 | 190 | 11 | 97 | 182 |
| 43 | 129 | 215 | 36 | 122 | 207 | 47 | 132 | 218 | 39 | 125 | 211 |
| 72 | 157 | 243 | 64 | 150 | 236 | 75 | 161 | 247 | 68 | 154 | 240 |
| 4 | 89 | 175 | 25 | 111 | 197 | 0 | 86 | 172 | 21 | 107 | 193 |
| 32 | 118 | 204 | 54 | 140 | 225 | 29 | 114 | 200 | 50 | 136 | 222 |
| 61 | 147 | 233 | 82 | 168 | 254 | 57 | 143 | 229 | 79 | 165 | 250 |
| 18 | 104 | 190 | 11 | 97 | 182 | 14 | 100 | 186 | 7 | 93 | 179 |
| 47 | 132 | 218 | 39 | 125 | 211 | 43 | 129 | 215 | 36 | 122 | 207 |
| 75 | 161 | 247 | 68 | 154 | 240 | 72 | 157 | 243 | 64 | 150 | 236 |

IMAGE PROCESSING METHOD AND APPARATUS

BACKGROUND OF THE INVENTION

The present invention relates to a method for quasi halftone processing of image that is used in printers, scanners, copy-machines and facsimile, and in which lower-gradation image data is reproduced by the modulation of a high or multi-gradation image into an image having a smaller number of gradations.

There is a systematic dither approach (hereinafter, referred to as dither) as one of the methods for quasi half-tone processing of multi-gradation images. We shall describe a binarizer for converting a multi-gradation image to a binary image by this conventional dither.

FIG. 7 is a diagram showing the construction of the conventional binarizer using the dither, and FIG. 8 shows the conventional dither matrix.

The binarizer will be briefly described with reference to FIG. 7. Referring to the figure, image data 1 is original multi-valued data to be binarized. These data to be binarized for use in printers are usually image data having four color components of black, cyan, magenta and yellow. Dither matrix storage unit 3 has a dither matrix stored therein as a table of threshold values shown in FIG. 8. This table is an example of the dither matrix that is used when the thickness of image data 1 has a range of 256 gradations from level 0 to level 255. This matrix data has so far been designed so that dots can be regularly arranged on the basis of a certain generation rule. There is also shown a comparator 2, which receives thickness data N of each pixel of each color component of the image data 1, and threshold data T corresponding to the coordinates of this image data from the dither matrix storage means 3. The comparator 2 then compares the image data N and the threshold data T to produce a binarization result Q of 1, or a binary signal of dot ON when N>T, and the binarization result Q of 0, or a binary signal of dot OFF when N<T. These processing operations are performed for all the pixel data of each of the color components that constitute the image data, thus finally generating binary image data.

SUMMARY OF THE INVENTION

It is generally known that the binary image generated by the conventional dither method is deteriorated in its gradation property and picture quality because a quasi contour or texture occurs in a certain thickness region, particularly in the low-thickness region. In addition, in the edge region is reduced the edge sharpness called jagy peculiar to the dither method, so that the edge reproducibility is remarkably lowered. The problems with the low thickness region in the prior art is ascribed to the dot pattern generated by the dither method. In other words, the periodic dot arrangement produced in the binarized image by the dither method causes the above problems. Moreover, since the dither method determines dot output by only the comparison with threshold, large error occurs in the binarized image relative to the original image, and hence it is difficult to reproduce the image with a satisfactory picture quality. Another method can be used to produce non-periodic dot output, and a method such as error diffusion method can be considered which can suppress the error between the original image and the binarized image to the minimum. However, although an effect of the edge reproducibility and quasi contour improvement can be confirmed in the low thickness region, the dot output is isolated, and hence dot saturation in the intermediate and high thickness region occurs depending on a printer used. In addition, the graininess deteriorates and good gradation property cannot be obtained. Accordingly, it is an object of the invention to solve these problems.

According to the present invention, in order to solve the above problems, dots are non-periodically produced in the low thickness region, and periodically produced in the intermediate and high thickness region. In addition, error diffusion processing is made in all thickness regions, and dots are produced one by one in the low thickness region in which the non-periodic dot arrangement is taken, and produced in a dot-concentrated manner in the intermediate and high thickness region in which the periodic dot arrangement is taken. Moreover, non-periodic dot output is used in the image edge region. Therefore, the quasi contour and gradation property in the low thickness region can be improved. Also, in the intermediate and high thickness region, use of the dot-concentrated arrangement reduces the dot saturation, leading to the improvement in the gradation property and graininess. Moreover, by taking the non-periodic dot arrangement in the edge region, it is possible to improve the reproducibility of the edges.

According to the invention (claim 1), there is provided an image processing method for making image gradation modulation to receive a multi-tone image and generate image data of a low gradation number by quasi halftone processing, characterized in that the dot arrangement of image after the gradation modulation is a mixture of a periodic dot output region and a non-periodic dot output region. Therefore, by use of the periodic dot output or non-periodic dot output in accordance with the feature of the image, it is possible to achieve the reproduction of a high-quality image with the above problems solved.

According to the invention (claim 2), there is provided the method characterized in that the periodic dot output region is an intermediate and high thickness region of the image. Therefore, by taking the periodic dot arrangement in the intermediate and high thickness region in which the dot density increases, it is possible to prevent the gradation property from being reduced by the saturation of dots, and the graininess from being deteriorated.

According to the invention (claim 3), there is provided the method characterized in that the non-periodic dot output region is a low thickness region of image. Therefore, the periodic texture occurrence in the low thickness region can be suppressed, and the quasi contour can be improved.

According to of the invention (claim 4), there is provided the method characterized in that the non-periodic dot output region is an edge portion of image. Therefore, a dot arrangement can be taken to follow the edge portion, and thus the edge reproducibility can be improved.

According to the invention (claim 5), there is provided the method characterized in that error diffusion method or mean error minimization method is applied to the periodic dot output thickness region, and a threshold matrix for periodic dot output is used as threshold values. Therefore, by applying periodic data to threshold values, it is possible to take a periodic arrangement of dot output after the error diffusion processing or mean error minimization method.

According to the invention (claim 6), there is provided the method characterized in that error diffusion method or mean error minimization method is applied to the non-periodic dot output thickness region, and a threshold matrix for non-periodic dot output is used as threshold values. Therefore, by applying non-periodic data to threshold values, it is possible to take a non-periodic arrangement of dot output after the error diffusion processing or mean error minimization method.

According to the invention (claim 7), there is provided the method characterized in that error weighting coefficients that are used for propagation of error in the error diffusion method or the mean error minimization method applied to the periodic dot output thickness region are different from those used for propagation of error in the error diffusion method or the mean error minimization method applied to the non-periodic dot output thickness region. Therefore, it is possible to take the dot shape and dot arrangement that are suitable for the periodic arrangement and non-periodic arrangement.

According to the invention (claim 8), there is provided the method characterized in that the dots generated in the periodic dot output thickness region are of a dot concentrated type. Therefore, by concentrating dots in the region in which the dot density increases, it is possible that even a printer easy to cause dot saturation stably produces dots, and thus that the graininess and the gradation reproducibility are improved.

According to the invention (claim 9), there is provided the method characterized in that the dots generated in the non-periodic dot output thickness region are isolated. Therefore, it is possible to prevent the graininess in the low thickness region from being deteriorated.

According to the invention (claim 10), there is provided the method characterized in that the error weighting coefficients used for propagation of error in the error diffusion method or mean error minimization method applied to the periodic dot output thickness region do not take the maximum for a pixel nearest to the pixel of interest. Therefore, concentrated dots can be formed.

According to the invention (claim 11), there is provided an image processing apparatus for making image gradation modulation to receive a multi-tone image, and generate image data of a low gradation number by quasi halftone processing, the image processing apparatus being characterized by having a unit for producing after the gradation modulation an image of which the dot arrangement has a mixture of a periodic dot output region and a non-periodic dot output region. Therefore, by using the periodic dot output or non-periodic dot output in accordance with the feature of the image, it is possible to reproduce a high-quality image with the above problems solved.

According to the invention (claim 12), there is provided the apparatus characterized by further having a unit for deciding if the dot arrangement of the image after the gradation modulation includes the periodic dot output region or the non-periodic dot output region. Therefore, it is possible to select the periodic dot output or non-periodic dot output in accordance with the feature of the image.

According to the invention (claim 13), there is provided the apparatus characterized by further having a unit for storing a threshold matrix for the periodic dot output, a unit for storing a threshold matrix for the non-periodic dot output, and a unit for selecting either one of the threshold matrix for the periodic dot output and the threshold matrix for the non-periodic dot output in accordance with the decision result from the decision unit according to claim 12. Therefore, by switching the threshold matrices, it is possible to selectively take the non-periodic dot output and the periodic dot output.

According to the invention (claim 14), there is provided the apparatus characterized by further having a unit for making propagation of error by error diffusion method or mean error minimization method, a unit for storing error weighting coefficients for the periodic dot output, a unit for storing error weighting coefficients for the non-periodic dot output, and a unit for selecting either one of the error weighting coefficients for the periodic dot output and the error weighting coefficients for the non-periodic dot output in accordance with the decision result from the decision unit according to claim 12. Therefore, by generating a high-reproducibility image by error propagation and selecting the error weighting coefficients to more accurately produce the isolated dots and concentrated dots, it is possible to stably reproduce dots and generate high-quality printing data.

According to the invention (claim 15), there is provided the apparatus characterized by further having a unit for detecting an edge portion in the received multi-tone image. Therefore, by detecting the edges, it is possible to take the non-periodic dot arrangement following the edge portion, and thus improve the edge reproducibility.

BRIEF DESCRIPTION OF THE DRAWINGS

FIGS. 2A and 2B show examples of the error diffusion coefficients used in the error diffusion processing according to the embodiment of the invention.

FIG. 3 shows one example of the threshold data used as the threshold values of the periodic dot output according to the embodiment of the invention.

FIG. 4 shows one example of the threshold data used as the threshold values of the non-periodic dot output according to the embodiment of the invention.

FIG. 8 shows the conventional dither matrix.

DESCRIPTION OF THE EMBODIMENTS

Figure 1:
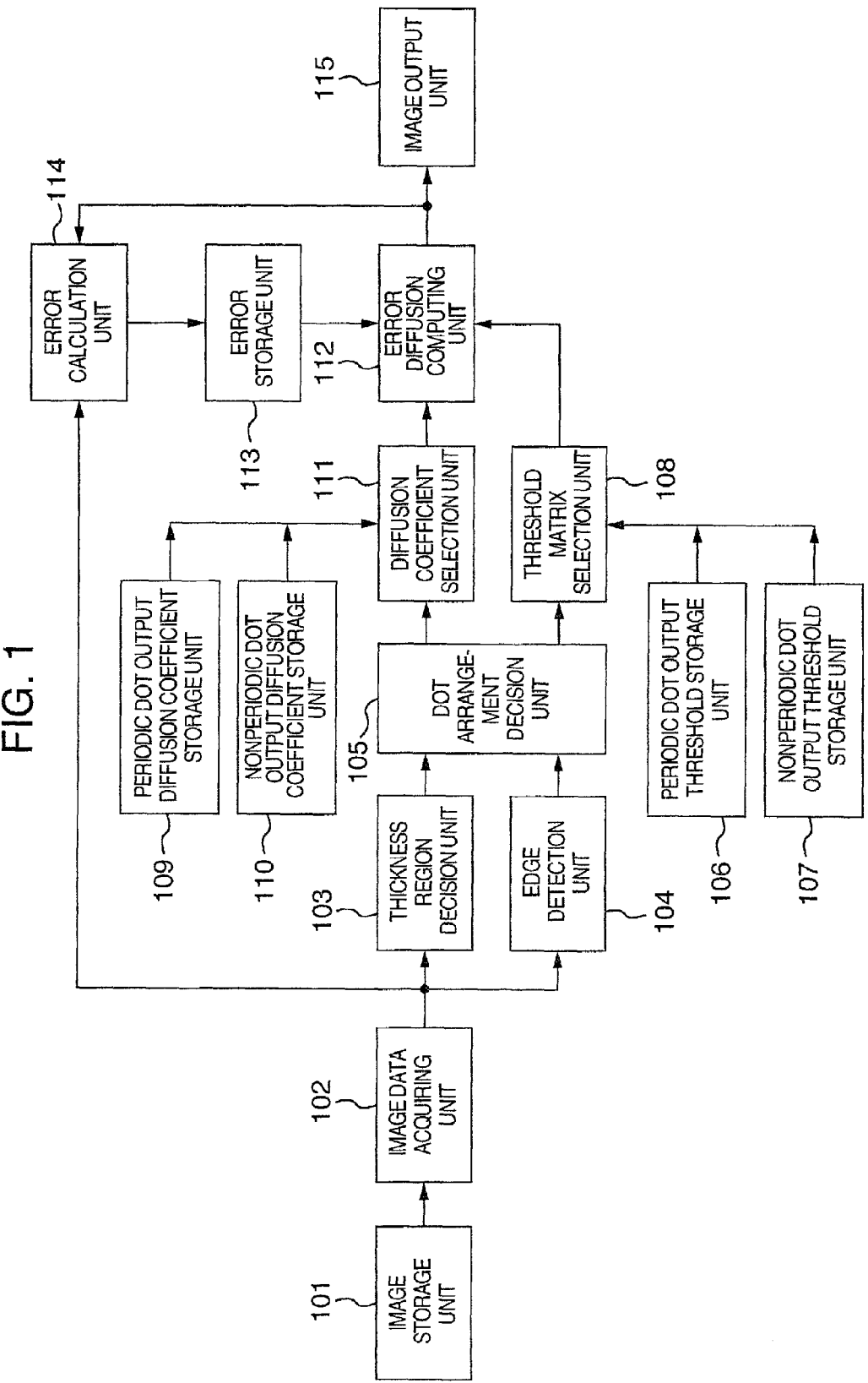
FIG. 1 shows an image processing apparatus using an image processing method according to one embodiment of the invention.

An embodiment of the invention will be described about the conversion of multi-tone image to binary data. FIG. 1 shows the construction of an image processing apparatus using an image processing method according to one embodiment of the invention.

Referring to FIG. 1, there is shown an image storage unit 101 for storing multi-valued image data to be processed. The pixel data of the image data within the image storage unit 101 is supplied pixel by pixel to an image data acquiring unit 102. The pixel data acquiring unit 102 acquires data of pixel units from the image data stored within the image storage unit 101, and supplies it to a thickness region decision unit 103 and to an edge detection unit 104. The thickness region decision unit 103 decides whether the pixel data acquired by the pixel data acquiring unit 102 is a low thickness region or an intermediate and high thickness region, and supplies the decision result to a dot arrangement decision unit 105. The edge detection unit 104 decides whether the pixel acquired by the pixel data acquiring unit 102 is an edge portion, and supplies it to the dot arrangement decision unit 105. The dot arrangement decision unit 105 decides whether the dot arrangement is periodically or non-periodically taken according to the thickness decision result from the thickness region decision unit 103 and to the edge decision result from the edge detection unit 104, and supplies the decision results to a diffusion coefficient selecting unit 111 and to a threshold matrix selecting unit 108. The diffusion coefficient selecting unit 111 selects a diffusion coefficient stored in either one of a periodic dot output coefficient storage unit 109 and a non-periodic dot output diffusion coefficient storage unit 110 on the basis of the dot arrangement decision result from the dot arrangement decision unit 105, and supplies it to an error diffusion computing unit 112. The threshold matrix selecting unit 108 selects threshold data stored in either one of a periodic dot output threshold storage unit 106 and a non-periodic dot output threshold storage unit 107 according to the dot arrangement decision result from the dot arrangement decision unit 105, and supplies it to the error diffusion computing unit 112. The error diffusion computing unit 112 makes error diffusion processing on the basis of the error diffusion coefficient produced from the diffusion coefficient selecting unit 111, the threshold produced from the threshold matrix selecting unit 108, and the error data stored in an error storage unit 113. The error diffusion computing unit 112 supplies the binary result after the processing to an image output unit 115, and to an error calculation unit 114. The error calculation unit 114 makes calculation of error caused upon binarization on the basis of the binary result from the error diffusion computing unit 112 and the pixel data produced from the pixel data acquiring unit 102, and supplies the error data to the error storage unit 113. The error storage unit 113 stores the error data fed from the error calculation unit 114, and supplies it to the error diffusion computing unit 112.

The embodiment of the invention about the above construction will be described in detail.

First, data of pixel units is obtained by the pixel data aquiring unit 102 from the image data stored in the image storage unit 101, and supplied to the thickness region decision unit 103, error calculation unit 114 and edge detection unit 104. The thickness region decision unit 103 decides whether this pixel is low thickness region or intermediate and high thickness region according to the pixel data produced from the pixel data acquiring unit 102. In other words, when the pixel data is represented by D, and when the thickness levels of the multi-tone image data stored in the image storage unit 101 have a width from 0 to 255, the thickness region decision unit 103 decides that, upon satisfying the condition of D<L where L is the boundary thickness level, L (0<L<255) of the low thickness region, the pixel data is in the low thickness region, and upon satisfying the condition of D≧L, the pixel data is in the intermediate and high thickness region. The edge detection unit 104 decides whether this pixel is edge region on the basis of the pixel data produced from the pixel data acquiring unit 102. The edge portion can be decided according to the pixel data including the pixel of interest, and a pixel or pixels adjacent to that pixel. Here, the way that this edge portion is decided will not be described. The result of deciding whether this pixel is edge portion is supplied to the dot arrangement decision unit 105 as is the thickness region information from the thickness region decision unit 103. The dot arrangement decision unit 105 receives the thickness region deciding result and the edge decision result, and decides whether periodic or non-periodic dot arrangement should be taken on the basis of these information. When the edge decision result is edge portion, non-periodic dot arrangement is decided irrespective of the thickness region. When it is not edge portion, but in low thickness region, the unit 105 decides the non-periodic dot arrangement. When it is not edge portion, but in the intermediate and high thickness region, the unit 105 decides the periodic dot arrangement. The dot arrangement decision result from the dot arrangement decision unit 105 is supplied to the diffusion coefficient selecting unit 111 and to the threshold matrix selecting unit 108. The diffusion coefficient selecting unit 111 that received the dot arrangement decision result selects the error diffusion coefficient from the periodic dot output diffusion coefficient storage unit 109 when the dot arrangement decision result is periodic dot arrangement or selects the error diffusion coefficient from the non-periodic dot output diffusion coefficient storage unit 110 when the dot arrangement decision result is non-periodic dot arrangement. Then, it supplies the error diffusion coefficient to the error diffusion computing unit 112. FIGS. 2A and 2B show examples of error diffusion coefficients for use in the error diffusion processing according to the embodiment of the invention. FIG. 2A shows an example of diffusion coefficients stored in the periodic dot output diffusion coefficient storage unit 109, and FIG. 2B shows an example of diffusion coefficients stored in the non-periodic dot output diffusion coefficient storage unit 110. In addition, FIGS. 2A and 2B show a pixel of interest 150 to be binarized, and two pixels 151 most adjacent to the pixel of interest 150. The periodic dot output diffusion coefficients shown in FIG. 2A have two diffusion coefficients of "0" nearest to the pixel of interest 150. Although the two pixels 151 nearest to the pixel of interest 150 are usually most weighted, those pixels are here dared to set as above in order that dots can be arranged in a concentrated manner. That is, since the dot output results at the two pixels 151 nearest to the pixel of interest 150 are not referred to, the result is that dots are arranged in a concentrated manner. On the contrary, the non-periodic dot output diffusion coefficients shown in FIG. 2B, stored in the storage unit 110, take a coefficient arrangement substantially similar to that of the generally used error diffusion coefficients.

The threshold matrix selecting unit 108 that received the dot arrangement decision result from the dot arrangement decision unit 105, when the dot arrangement decision result is periodic dot arrangement, acquires a threshold corresponding to the currently processed pixel from the periodic dot output threshold storage unit 106, and supplies it to the error diffusion computing unit 112. FIG. 3 shows an example of the threshold data used as the periodic dot output threshold values according to the embodiment of the invention. In the figure, the pixels indicated by the bold italics correspond to the center dots where dots are centered. These centered dots are periodically arranged as illustrated. Around the center dots are arranged threshold values so that dots can be concentrated at the center dots. Thus, the concentrated dots that grow from the center dots are produced by periodic arrangement of center dots.

When the dot arrangement decision result is non-periodic dot arrangement, the threshold matrix selecting unit 108 acquires a threshold corresponding to the currently processed pixel from the non-periodic dot output threshold storage unit 107, and supplies it to the error diffusion computing unit 112. FIG. 4 shows an example of the threshold data used as the non-periodic dot output threshold values according to the embodiment of the invention. In the figure, the pixels indicated by the bold italics correspond to the center dots where dots are concentrated. These center dots are non-periodically arranged as illustrated. Around the center dots are arranged threshold values so that dots can be non-periodically arranged. Thus, non-periodically arranged dots are produced.

Then, the error diffusion computing unit 112 determines the amounts of error diffusion according to the input diffusion coefficients, and makes binarizing processing on the basis of the input threshold. The binarized result is supplied to the image output unit 115, and to the error calculation unit 114. The error calculation unit 114 calculates binarization error at the current pixel on the basis of the binarized result from the error diffusion computing unit 112 and the pixel data produced from the pixel data acquiring unit 102, and supplies it to the error storage unit 113. The error storage unit 113 stores the error data fed from the error calculation unit 114, and supplies it as error for the next pixel to the error diffusion computing unit 112. The above processing operations are performed for all pixels of the input image.

Figure 5:
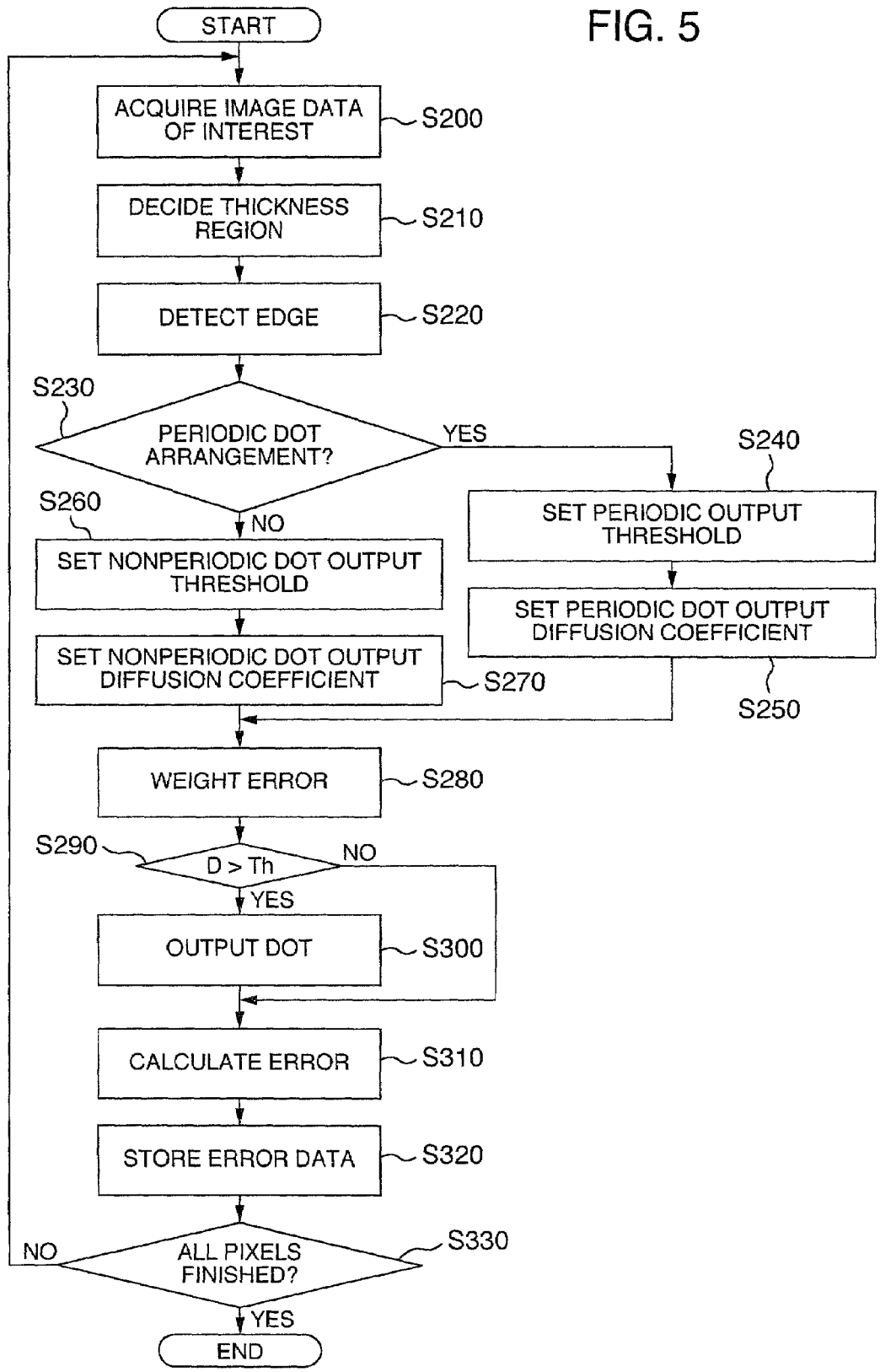
FIG. 5 is a flowchart showing the flow of the processing according to the embodiment of the invention.

The embodiment of the invention will be further described with reference to FIG. 5 that is a flowchart showing the process flow according to the embodiment of the invention.

First, pixel data as a pixel of interest to be processed is acquired (step S200). Then, decision is made if the thickness of that pixel is in the low thickness region or the intermediate and high region (step S210). In addition, decision is made if that pixel is an edge portion (step S220). Then, decision is made if dots are periodically or non-periodically arranged (step S230). Here, the decision condition is that if the pixel of interest is in the intermediate and high thickness region or not the edge portion, dots are periodically arranged, and if the pixel of interest is in the low thickness region or the edge portion, dots are non-periodically produced. If, at step S230, the decision result is periodic dot arrangement, threshold values are set in order that dots can be periodically arranged (step S240). In addition, error diffusion coefficients are set in order that dots can be periodically arranged (step S250). If, at step S230, the decision result is non-periodic dot arrangement, threshold values are set in order that dots can be non-periodically arranged (step S260). Additionally, error diffusion coefficients are set in order that dots can be non-periodically arranged (step S270). Then, weighting error at the pixel of interest is calculated by use of the set error diffusion coefficients, and added to data of the pixel of interest acquired at step S200, thereby producing the pixel data of interest, D after error weighting (step S280). Moreover, this pixel data D after error weighting is compared with the set threshold value Th (step S290). If D>Th, dot is produced (step S300). If D≦Th, no dot is produced. Then, error occurring upon binarization is calculated (step S310), and the calculated error is stored and maintained (step S320). The above processing operations are made for all pixels of the input image (step S330), and the binarization processing ends.

While a method of generating binary images in this embodiment has been described, the binary error diffusion method given in the description of this embodiment can be applied even to a multi-valued output of ternary or above value by expanding it to a multi-valued error diffusion method.

Figure 6:
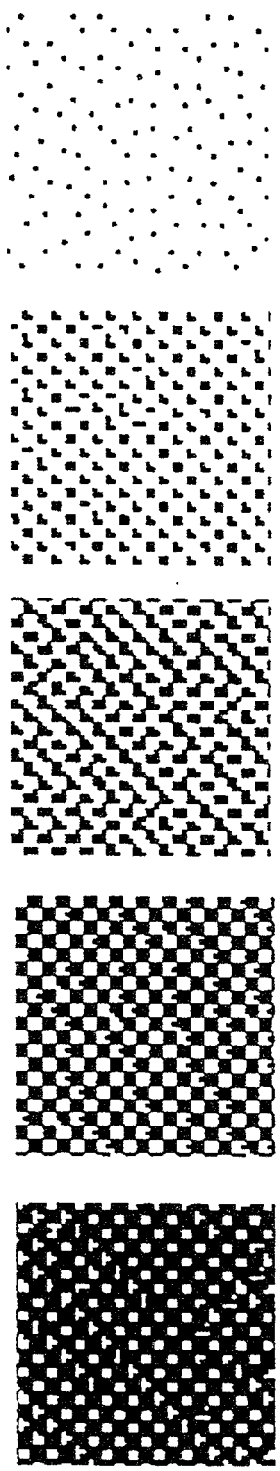
FIG. 6 shows the dot arrangement after the binarization according to the embodiment of the invention.
Figure 7:
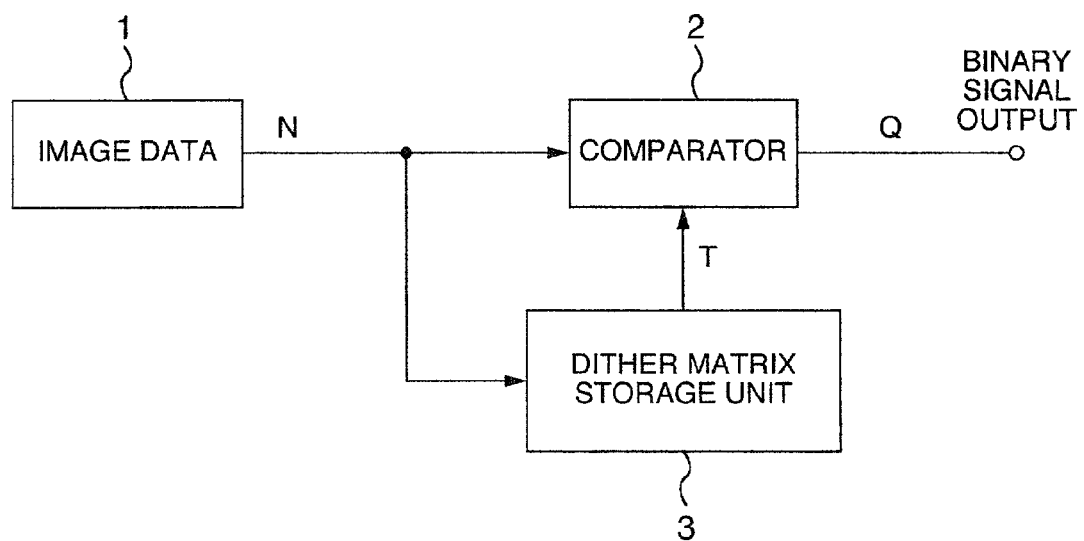
FIG. 7 shows the conventional binarizing apparatus.

Thus, according to the present invention, the error diffusion processing can be performed for all thickness regions, non-periodic dot arrangement can be taken for the low thickness region and edge portion, and periodic dot arrangement can be taken for the intermediate and high thickness region. In addition, dot-concentrated type dots can be formed, and periodic texture in the low thickness region can be removed. Additionally, since dots in the edge portion can be arranged to non-periodically follow the edge portion, the edge reproducibility can be improved. Moreover, since concentrated dots are periodically formed in the intermediate and high thickness region, even a printer of which the print dots are unstable can be improved in the dot saturation and graininess deterioration. Also, since the error occurring upon binarization can be minimized by the error diffusion processing, the image reproducibility after binarization can be greatly increased. Therefore, high-quality picture printing is possible because the factors that have great effect on the printed picture quality, such as the graininess in the low thickness region, edge reproducibility, and gradation reproducibility by stable dot output in the intermediate and high thickness region, can be improved. FIG. 6 shows the dot arrangement after binarization according to the embodiment of the invention. From FIG. 6, it will be understood that small dots are non-periodically arranged in the low thickness region, and that concentrated dots are periodically arranged in the intermediate and high thickness region.

What is claimed is:

1. An image processing method comprising:
   gradation modulating a multi-tone image to produce a processed image, wherein:
   a dot arrangement of the processed image is a mixture of a periodic dot output region and a non-periodic dot output region, and
   the periodic dot output region is an intermediate or high thickness region of the multi-tone image.

2. An image processing method comprising:
   gradation modulating a multi-tone image to produce a processed image, wherein:
   a dot arrangement of the processed image is a mixture of a periodic dot output region and a non-periodic dot output region, and
   the non-periodic dot output region is a low thickness region of the multi-tone image.

3. An image processing method comprising:
   gradation modulating a multi-tone image to produce a processed image, wherein:
   a dot arrangement of the processed image is a mixture of a periodic dot output region and a non-periodic dot output region, and
   the non-periodic dot output region is an edge portion of the multi-tone image.

4. An image processing method comprising:
   gradation modulating a multi-tone image to produce a processed image, wherein:
   a dot arrangement of the processed image is a mixture of a periodic dot output region and a non-periodic dot output region,
   an error diffusion method or a mean error minimization method is applied to the periodic dot output region and the non-periodic dot output region, and
   error weighting coefficients, used for error propagation in said error diffusion method or said mean error minimization method, that are applied to said periodic dot output region are different from those applied to said non-periodic dot output region.

5. An image processing method comprising:
   gradation modulating a multi-tone image to produce a processed image, wherein:
   a dot arrangement of the processed image is a mixture of a periodic dot output region and a non-periodic dot output region, and
   the dots generated in said periodic dot output region are of a dot concentrated type.

6. An image processing method comprising:
   gradation modulating a multi-tone image to produce a processed image, wherein:
   a dot arrangement of the processed image is a mixture of a periodic dot output region and a non-periodic dot output region, and error weighting coefficients used for error propagation in an error diffusion method or a mean error minimization method applied to said periodic dot output region do not take a maximum value for a pixel nearest to a pixel of interest.

7. An image processing apparatus comprising:
a decision means for deciding whether a multi-tone image includes a periodic or non-periodic dot arrangement; and
a gradation modulating means for gradation modulating the multi-tone image to produce a dot arrangement for a processed image that is a mixture of a periodic dot output region and a non-periodic dot output region.

8. An image processing apparatus according to claim 7, further comprising:
a means for storing a first threshold matrix for said periodic dot output region;
a means for storing a second threshold matrix for said non-periodic dot output region; and
a means for selecting the first threshold matrix or the second threshold matrix in accordance with a decision result from said decision means.

9. An image processing apparatus according to claim 7, further comprising:
a means for propagating an error through an error diffusion method or a mean error minimization method;
a means for storing first error weighting coefficients for said periodic dot output region;
a means for storing second error weighting coefficients for said non-periodic dot output region; and
a means for selecting the first or second error weighting coefficients in accordance with a decision result from said decision means.

10. An image processing apparatus comprising:
a detection means for detecting an edge portion in a multi-tone image; and
a gradation modulating means for gradation modulating the multi-tone image to produce a dot arrangement for a processed image that is a mixture of a periodic dot output region and a non-periodic dot output region in accordance with detection results of the detection means.

11. An image processing apparatus comprising:
an image data acquiring unit that acquires pixel data from image data having a plurality of colors;
a thickness region decision unit that decides whether the pixel data acquired by said image data acquiring unit includes pixels at a thickness region having a thickness lower than a predetermined value or includes pixels at a thickness region having a thickness equal to or higher than the predetermined value; and
an image output unit that outputs, responsive to the decision of said thickness region decision unit, an arrangement of pixels non-periodically when the pixel data includes pixels at a thickness region having a thickness lower than the predetermined value and outputs an arrangement of pixels periodically when the pixel data includes pixels at a thickness region having a thickness equal to or higher than the predetermined value.

12. An image processing apparatus according to claim 11, further comprising:
a dot arrangement decision unit that decides, responsive to the decision of said thickness region decision unit, that pixels are arranged non-periodically when the pixel data includes pixels at a thickness region having a thickness lower than the predetermined value and that pixels are arranged periodically when the pixel data includes pixels at a thickness region having a thickness equal to or higher than the predetermined value, wherein
said image output unit outputs, responsive additionally to the decision of said dot arrangement decision unit, the arrangement of pixels decided by the dot arrangement decision unit.

13. An image processing apparatus according to claim 11, further comprising:
a dot arrangement decision unit that decides, responsive to the decision of said thickness region decision unit, that pixels are arranged non-periodically when the pixel data includes pixels at a thickness region having a thickness lower than the predetermined value and that pixels are arranged periodically when the pixel data includes pixels at a thickness region having a thickness equal to or higher than the predetermined value;
a periodic dot output threshold storage unit that stores a periodic dot output threshold value when dots are arranged periodically;
a non-periodic dot output threshold storage unit that stores a non-periodic dot output threshold value when the dots are arranged non-periodically;
a threshold matrix selecting unit that selects, responsive to the decision of said dot arrangement decision unit, one of the periodic dot output threshold value stored in said periodic dot output threshold storage unit and the non-periodic dot output threshold value stored in said non-periodic dot output threshold storage unit;
a periodic dot output diffusion coefficient storage unit that stores a periodic dot output diffusion coefficient when the dots are arranged periodically;
a non-periodic dot output diffusion coefficient storage unit that stores a non-periodic dot output diffusion coefficient when the dots are arranged non-periodically;
a diffusion coefficient selecting unit that selects, responsive to the decision of said dot arrangement decision unit, one of the periodic dot output diffusion coefficient stored in said periodic dot output diffusion coefficient storage unit and the non-periodic dot output diffusion coefficient stored in said non-periodic dot output diffusion coefficient storage unit; and
an error diffusion computing unit that computes an error diffusion from the diffusion coefficient selected by said diffusion coefficient selecting unit and performs binary processing based on the threshold value selected by said threshold matrix selecting unit, wherein
said image output unit outputs, responsive additionally to an output from said error diffusion computing unit, the arrangement of pixels decided by the dot arrangement decision unit.

14. An image processing apparatus according to claim 13, further comprising:
an error calculation unit that calculates an error produced, when the binary processing is performed, from: (1) binary-processed pixel data calculated by said error diffusion computing unit and (2) the image data acquired pixel by pixel by said image data acquiring unit, wherein
said error diffusion computing unit computes the error diffusion of the image data from: (1) error data calculated by the error calculation unit, (2) the diffusion coefficient selected by said diffusion coefficient selecting unit, and (3) the threshold value selected by said threshold matrix selecting unit.

15. An image processing apparatus according to claim 11, further comprising an edge detection unit that decides whether or not multi-tone image data acquired by said image data acquiring unit includes pixels at an edge region.

16. An image processing apparatus comprising:
    an image data acquiring unit that acquires pixel data from image data having a plurality of colors;
    an edge detection unit that decides whether or not the pixel data acquired by said image data acquiring unit includes pixels at an edge region; and
    an image output unit that outputs, responsive to the decision of said edge detection unit, an arrangement of pixels non-periodically when the pixel data includes pixels at the edge region.

17. An image processing apparatus according to claim 16, further comprising:
    a thickness region decision unit that decides, responsive to the decision of said edge detection unit, whether the pixel data includes pixels at a thickness region having a thickness lower than a predetermined value or includes pixels at a thickness region having a thickness equal to or higher than the predetermined value, when the pixel data includes pixels that are out of the edge region, wherein
    said image output unit outputs, responsive to the decision of said thickness region decision unit, an arrangement of pixels non-periodically when the pixel data includes pixels at a thickness region having a thickness lower than the predetermined value and outputs an arrangement of pixels periodically when the pixel data includes pixels at a thickness region having a thickness equal to or higher than the predetermined value.

18. An image processing apparatus comprising:
    an image data acquiring unit that acquires pixel data from image data having a plurality of colors;
    a thickness region decision unit that decides whether the pixel data acquired by said image data acquiring unit includes pixels at a thickness region having a thickness lower than a predetermined value or includes pixels at a thickness region having a thickness equal to or higher than the predetermined value;
    an edge detection unit that decides whether or not the pixel data acquired by said image data acquiring unit includes pixels at an edge region; and
    an image output unit that outputs, responsive to the decision of said thickness region decision unit or said edge detection unit, an arrangement of pixels non-periodically when the pixel data includes pixels at a thickness region having a thickness lower than the predetermined value and outputs an arrangement of pixels periodically when the pixel data includes pixels at a thickness region having a thickness equal to or higher than the predetermined value.

19. An image processing apparatus according to claim 18, further comprising:
    a dot arrangement decision unit that decides, responsive to the decision of said thickness region decision unit or said edge detection unit, that pixels are arranged non-periodically when the pixel data includes pixels within a thickness region having a thickness lower than the predetermined value and that pixels are arranged periodically when the pixel data includes pixels within a thickness region having a thickness equal to or higher than the predetermined value, wherein
    said image output unit outputs, responsive additionally to the decision of said dot arrangement decision unit, the arrangement of pixels decided by the dot arrangement decision unit.

20. An image processing apparatus according to claim 18, further comprising:
    a dot arrangement decision unit that decides, responsive to the decision of said thickness region decision unit or said edge detection unit, that pixels are arranged non-periodically when the pixel data includes pixels within a thickness region having a thickness lower than the predetermined value and that pixels are arranged periodically when the pixel data includes pixels within a thickness region having a thickness equal to or higher than the predetermined value;
    a periodic dot output threshold storage unit that stores a periodic dot output threshold value when dots are arranged periodically;
    a non-periodic dot output threshold storage unit that stores a non-periodic dot output threshold value when the dots are arranged non-periodically;
    a threshold matrix selecting unit that selects, responsive to the decision of said dot arrangement decision unit, one of the periodic dot output threshold value stored in said periodic dot output threshold storage unit and the non-periodic dot output threshold value stored in said non-periodic dot output threshold storage unit;
    a periodic dot output diffusion coefficient storage unit that stores a periodic dot output diffusion coefficient when the dots are arranged periodically;
    a non-periodic dot output diffusion coefficient storage unit that stores a non-periodic dot output diffusion coefficient when the dots are arranged non-periodically;
    a diffusion coefficient selecting unit that selects, responsive to the decision of said dot arrangement decision unit, one of the periodic dot output diffusion coefficient stored in said periodic dot output diffusion coefficient storage unit and the non-periodic dot output diffusion coefficient stored in said non-periodic dot output diffusion coefficient storage unit; and
    an error diffusion computing unit that computes an error diffusion from the diffusion coefficient selected by said diffusion coefficient selecting unit and performs binary processing based on the threshold value selected by said threshold matrix selecting unit, wherein
    said image output unit outputs, responsive additionally to an output from said error diffusion computing unit, the arrangement of pixels decided by the dot arrangement decision unit.

21. An image processing apparatus according to claim 20, further comprising:
    an error calculation unit that calculates an error produced, when the binary processing is performed, from: (1) binary-processed pixel data calculated by said error diffusion computing unit and (2) the image data acquired pixel by pixel by said image data acquiring unit, wherein
    said error diffusion computing unit computes the error diffusion of the image data from: (1) error data calculated by the error calculation unit, (2) the diffusion coefficient selected by said diffusion coefficient selecting unit, and (3) the threshold value selected by said threshold matrix selecting unit.

22. An image processing apparatus according to claim 18, further comprising an edge detection unit that decides whether or not multi-tone image data acquired by said image data acquiring unit includes pixels at an edge region.

23. An image processing apparatus comprising:
an image data acquiring unit that acquires pixel data from image data having a plurality of colors;
a thickness region decision unit that decides whether the pixel data acquired by said image data acquiring unit includes pixels at a thickness region having a thickness lower than a predetermined value or includes pixels at a thickness region having a thickness equal to or higher than the predetermined value; and
an image output unit that outputs, responsive to the decision of said thickness region decision unit, target pixels, relative to pixels adjacent to the target pixels and outputted immediately before the target pixels, with non-periodic time intervals when the thickness region decision unit decides that the pixel data includes pixels at a thickness region having a thickness lower than the predetermined value and outputs the target pixels, relative to pixels adjacent to the target pixels and outputted immediately before the target pixel, with periodic time intervals when the thickness region decision unit decides that the pixel data includes pixels at a thickness region having a thickness equal to or higher than the predetermined value.

24. An image processing apparatus according to claim 23, further comprising:
a dot arrangement decision unit that decides, responsive to the decision of said thickness region decision unit, that the target pixels are arranged relative to pixels adjacent to the target pixels and outputted immediately before the target pixels with non-periodic time intervals when it is decided that the pixel data includes pixels within a thickness region having a thickness lower than the predetermined value and decides that the target pixels are arranged relative, to pixels adjacent to the target pixels and outputted immediately before the target pixels with periodic time intervals when it is decided that the pixel data includes pixels within a thickness region having a thickness equal to or higher than the predetermined value, wherein
said image output unit outputs, responsive additionally to the decision of said dot arrangement decision unit, the arrangement of the target pixels decided by the dot arrangement decision unit.

25. An image processing apparatus according to claim 23, further comprising:
a dot arrangement decision unit that decides, responsive to the decision of said thickness region decision unit, that target pixels are arranged relative to pixels adjacent to the target pixels and arranged immediately before the target pixels with periodic time intervals when it is decided that the pixel data includes pixels within a thickness region having a thickness lower than the predetermined value and decides that the target pixels are arranged relative to the pixels adjacent to the target pixels and arranged immediately before the target pixels with periodic time intervals when it is decided that the pixel data includes pixels within a thickness region having a thickness equal to or higher than the predetermined value;
a periodic dot output threshold storage unit that stores a periodic dot output threshold value when dots are arranged periodically;
a non-periodic dot output threshold storage unit that stores a non-periodic dot output threshold value when the dots are arranged non-periodically;
a threshold matrix selecting unit that selects, responsive to the decision of said dot arrangement decision unit, one of the periodic dot output threshold value stored in said periodic dot output threshold storage unit and the non-periodic dot output threshold value stored in said non-periodic dot output threshold storage unit;
a periodic dot output diffusion coefficient storage unit that stores a periodic dot output diffusion coefficient when the dots are arranged periodically;
a non-periodic dot output diffusion coefficient storage unit that stores a non-periodic dot output diffusion coefficient when the dots are arranged non-periodically;
a diffusion coefficient selecting unit that selects, responsive to the decision of said dot arrangement decision unit, one of the periodic dot output diffusion coefficient stored in said periodic dot output diffusion coefficient storage unit and the non-periodic dot output diffusion coefficient stored in said non-periodic dot output diffusion coefficient storage unit; and
an error diffusion computing unit that computes an error diffusion from the diffusion coefficient selected by said diffusion coefficient selecting unit and performs a binary processing based on the threshold value selected by said threshold matrix selecting unit, wherein
said image output unit outputs, responsive additionally to an output from said error diffusion computing unit, the arrangement of the target pixels decided by the dot arrangement decision unit.

26. An image processing apparatus according to claim 25, further comprising:
an error calculation unit that calculates an error produced, when the binary processing is performed, from: (1) binary-processed pixel data calculated by said error diffusion computing unit and (2) the image data acquired pixel by pixel by said image data acquiring unit, wherein
said error diffusion computing unit computes the error diffusion of the image data from: (1) error data calculated by the error calculation unit, (2) the diffusion coefficient selected by said diffusion coefficient selecting unit, and (3) the threshold value selected by said threshold matrix selecting unit.

27. An image processing apparatus according to claim 23, further comprising an edge detection unit that decides whether or not multi-tone image data acquired by said image data acquiring unit includes pixels at an edge region.

* * * * *